United States Patent
Childress, Jr.

(10) Patent No.: US 7,469,167 B2
(45) Date of Patent: Dec. 23, 2008

(54) PREDICTIVE HEADER PRESSURE CONTROL

(76) Inventor: Ronald L. Childress, Jr., 108 Rock Bridge Close, Easley, SC (US) 29640

( * ) Notice: Subject to any disclaimer, the term of this patent is extended or adjusted under 35 U.S.C. 154(b) by 501 days.

(21) Appl. No.: 11/091,045

(22) Filed: Mar. 28, 2005

(65) Prior Publication Data

US 2006/0085098 A1   Apr. 20, 2006

Related U.S. Application Data

(60) Provisional application No. 60/621,005, filed on Oct. 20, 2004, provisional application No. 60/623,265, filed on Oct. 29, 2004.

(51) Int. Cl.
  *G06F 19/00*   (2006.01)
(52) U.S. Cl. .................. 700/288; 700/36
(58) Field of Classification Search .......... 700/33, 700/30, 286, 295, 301, 291, 36, 288, 282, 700/23, 46; 702/45
See application file for complete search history.

(56) References Cited

U.S. PATENT DOCUMENTS

| | | | |
|---|---|---|---|
| 3,914,795 A | 10/1975 | Alliston et al. | |
| 3,919,720 A | 11/1975 | Alliston | |
| 4,042,813 A | 8/1977 | Johnson | |
| 4,201,924 A * | 5/1980 | Uram | 290/40 R |
| 4,628,462 A * | 12/1986 | Putman | 700/288 |
| 4,660,166 A | 4/1987 | Hopfield | |
| 4,719,591 A | 1/1988 | Hopfield et al. | |
| 4,819,435 A * | 4/1989 | Silvestri, Jr. | 60/646 |
| 4,916,328 A | 4/1990 | Culp, III | |
| 4,937,872 A | 6/1990 | Hopfield et al. | |
| 5,289,362 A | 2/1994 | Liebl et al. | |
| 5,598,349 A | 1/1997 | Elliason et al. | |
| 5,926,776 A | 7/1999 | Glorioso et al. | |
| 5,999,888 A * | 12/1999 | Aubee | 702/45 |
| 6,181,985 B1 | 1/2001 | O'Donnell et al. | |
| 6,185,483 B1 | 2/2001 | Drees | |
| 6,343,277 B1 | 1/2002 | Gaus et al. | |
| 6,430,533 B1 | 8/2002 | Kolluru et al. | |
| 6,430,544 B1 * | 8/2002 | Childress | 706/1 |
| 6,487,509 B1 | 11/2002 | Aisa | |
| 6,553,418 B1 | 4/2003 | Collins et al. | |

(Continued)

OTHER PUBLICATIONS

King, Bruce et al., "Plant-wide distributed control is key to an efficient waste wood fuel systems at Augusta Newsprint," Energy Engineering and Management in Pulp and Paper Industry, TAPPI, vol./Issue:69, Mar. 1, 1986, p. 92-95.

(Continued)

*Primary Examiner*—Kidest Bahta
(74) *Attorney, Agent, or Firm*—Turner Padget Graham & Laney, P.A.

(57) ABSTRACT

A predictive header pressure controller uses predictive boiler steaming models to anticipate future changes in boiler steaming rates, converts the anticipated steaming rates to anticipated rates of change in header pressure, compares the anticipated rates of change of header pressure to measured rates of change of header pressure and controls header pressure of a multi-boiler energy system to a derived rate of change header pressure setpoint. The control may be accomplished by a control action that is integral only or it may be an incremental output directly compatible with distribution hubs. A control signal is directed to one or more control devices that adjust and control header pressure.

25 Claims, 19 Drawing Sheets

U.S. PATENT DOCUMENTS

| | | | |
|---|---|---|---|
| 6,591,620 | B2 | 7/2003 | Kikuchi et al. |
| 6,603,218 | B1 | 8/2003 | Aisa |
| 6,633,823 | B2 | 10/2003 | Bartone et al. |
| 6,751,783 | B1 | 6/2004 | Eneboe et al. |
| 6,832,134 | B2 * | 12/2004 | Havlena ................... 700/291 |
| 6,918,356 | B2 * | 7/2005 | Rowe et al. .............. 122/448.1 |
| 2004/0193329 | A1 * | 9/2004 | Ransom et al. ............ 700/286 |
| 2005/0045117 | A1 * | 3/2005 | Rowe et al. .............. 122/448.1 |
| 2005/0159824 | A1 | 7/2005 | Childress, Jr. |

OTHER PUBLICATIONS

Childress, Jr., "Closed-Loop Energy Management Control of Large Industrial Facilities," Industrial Energy Technology Conference (IETC) Houston, Texas, Apr. 16-19, 2002 p. 5-13.

Childress, Jr. et al., "Rule Based Energy Management and Reporting System (EMRS) Applied to a Large Utility Power System Complex," Industrial Energy Technology Conference (IETC) Houston, Texas, Apr. 20-23, 2004, p. 37-46.

Liptak, Bela G., Instrument Engineers' Handbook, 3rd Edition, Chilton Book Company, 1995 p. 1043-1057.

Instrumentation and Control Systems for Fired Heaters and Steam Generators, API Recommended Practice 556, First Edition, May 1997.

Childress, Jr., "Real Time Pricing Tie Line Control: A Case Study," Industrial Energy Technology Conference (IETC), Houston, Texas, May 12-13, 1999, p. 117-121.

AAI Web Access Utility—Product Description Revision 1.0 Dated Dec. 1, 2002.

* cited by examiner

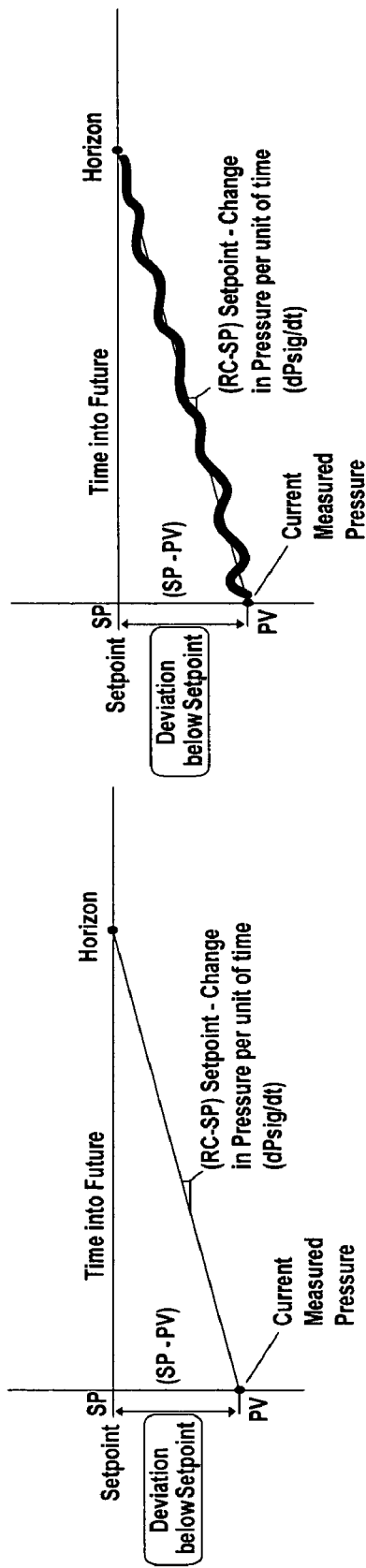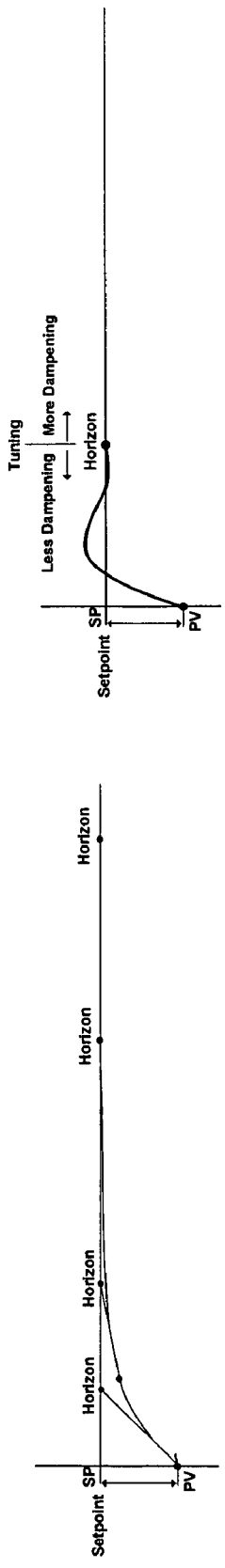
FIGURE 16A
FIGURE 16B
FIGURE 16C
FIGURE 16D

PREDICTIVE HEADER PRESSURE CONTROL

CROSS-REFERENCE TO RELATED APPLICATIONS

This application is related to, and claims priority of Provisional Application Ser. No. 60/621,005, filed Oct. 20, 2004 and Provisional Patent Application Ser. No. 60/623,265, filed Oct. 29, 2004 the contents of each of which are hereby incorporated by reference.

FIELD OF THE INVENTION

The present invention generally relates to control systems, and more particularly to control systems used in energy production applications.

BACKGROUND

In today's energy production industry, in particular in modern powerhouse operations, it is important to maintain the energy producing processes and systems at desired production levels to assure that environmental and other constraints are adhered to and operating costs are minimized. It would be particularly desirable to maintain controllable parameters, outputs and setpoint at desired values on a real-time basis but conventional control systems typically lag behind in maintaining control since typical control systems monitor measurable quantities and attempt to control by adjusting a controllable variable, output or setpoint after the measurable quantity has gone out of control or beyond setpoint. There is a time lag associated with this adjustment period. During such time when a process is out of control and not at setpoint, additional fuels or other resources may be unnecessarily consumed making the system economically inefficient.

Efficient, cost saving control systems are particularly advantageous in multi-boiler steam production systems in which the control system desirably maintains header pressure at a desired setpoint by controlling controllable devices that control parameters such as input fuel quantity which may be gases, oils, bark or other fuels, or the ratios between the incoming fuels delivered to various boilers. When excess fuel is unnecessarily used to produce a steam header pressure that exceeds a desired header pressure setpoint, economic losses are incurred in addition to the system being out of control. It would obviously be desirable to prevent this by maintaining header pressure at setpoint. In particular, it would be desirable to provide an automated control system that maintains a steam header in an energy production system at a constant desired setpoint without the fluctuations associated with time lags associated with correcting an out of control system after it has gone out of control. The present invention addresses such needs.

SUMMARY OF THE INVENTION

To address these and other needs and in view of its purposes, the present invention provides a method for controlling a process variable in a system. The method includes predicting an expected change in steam generation rate based on changes in a first setpoint in an associated steam generation apparatus, for at least one steam generation apparatus. For each steam generation apparatus, the method provides for converting the expected change in steam generation rate to an associated anticipated rate of change in header pressure. The method further includes measuring actual header pressure rate of change, combining the actual header pressure rate of change and each of the anticipated rates of change, to produce a combined header pressure rate of change, deriving a header pressure rate of change setpoint, comparing the header pressure rate of change setpoint to the combined header pressure rate of change and controlling the header pressure by generating a control signal that controls the header pressure based on comparing.

Another aspect of the invention provides a method for controlling a controllable variable in a system. The method includes predicting an expected change in an output that is a delayed response to changes in at least one setpoint in an associated apparatus, for at least one said apparatus, then, for each apparatus, converting the expected change in the output to an associated anticipated rate of change in the controllable variable. The method further provides measuring actual rate of change of the controllable variable, combining the actual rate of change and each of the anticipated rates of change to produce a combined rate of change, deriving a rate of change setpoint, comparing the rate of change setpoint to the combined rate of change, and controlling the controllable variable by generating a control signal that controls a rate of change of the controllable variable based on comparing.

In another aspect the invention provides a method for controlling a process variable in a system, the method comprising predicting an expected change in steam generation rate based on changes in a first setpoint in an associated steam generation apparatus, for at least one steam generation apparatus that affects header pressure of said system. For each steam generation apparatus, the method provides for converting the expected change in steam generation rate to an associated anticipated rate of change in header pressure, measuring actual rate of change of header pressure, and controlling header pressure by sending a control signal based on the actual rate of change and each of the anticipated rates of change.

The invention further provides a predictive control system that includes means for predicting an expected change in steam generation rate based on changes in at least one setpoint in an associated steam generation apparatus for at least one steam generation apparatus. The system includes for each steam generation apparatus, means for converting the expected change in steam generation rate to an associated anticipated rate of change in header pressure, means for measuring actual header pressure rate of change, means for combining the actual header pressure rate of change and each of the anticipated rates of change, to produce a combined header pressure rate of change, and means for deriving a header pressure rate of change setpoint. The system further includes a comparator that compares the header pressure rate of change setpoint to the combined header pressure rate of change and a controller that receives information from the comparator and generates a control signal that controls the header pressure based on the conveyed information.

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing.

FIGS. 16A-16D are graphs illustrating the role of a horizon time constant in calculating a rate of change setpoint;

DETAILED DESCRIPTION

Figure 1:
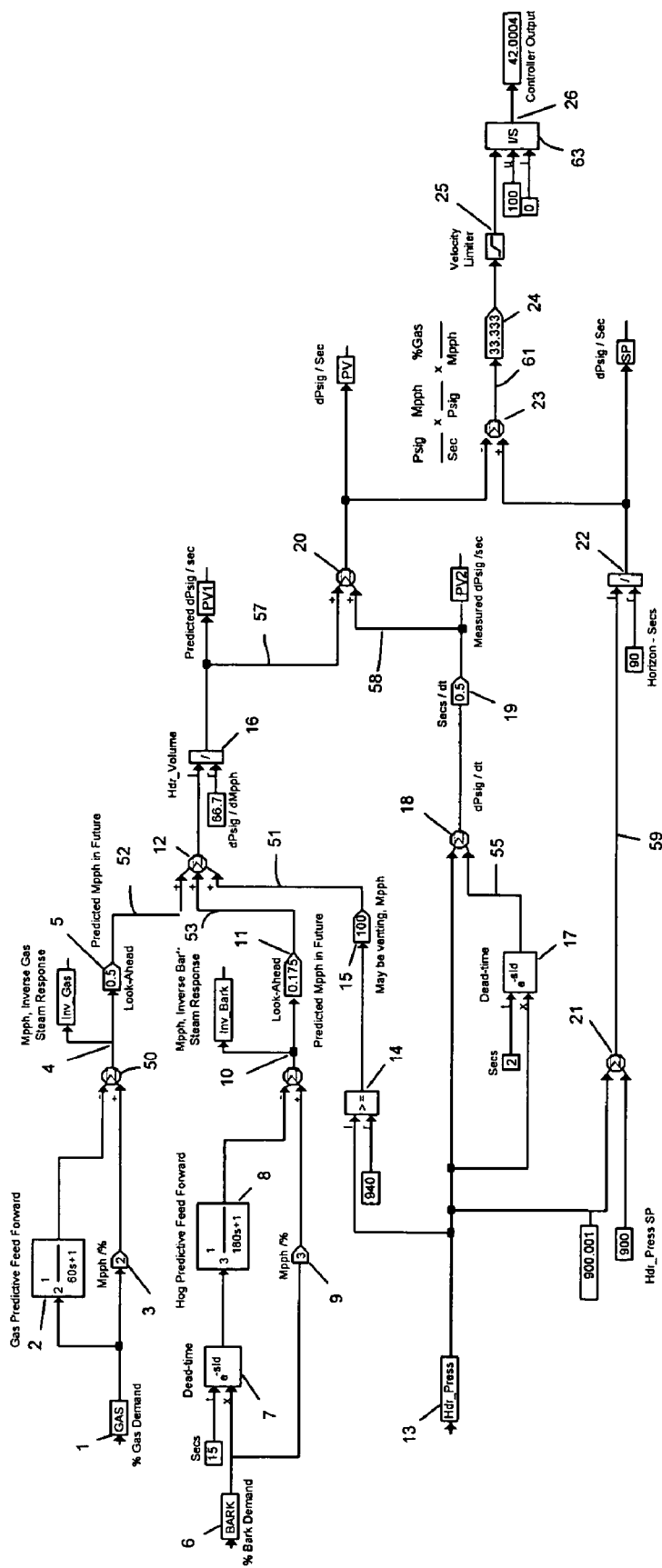
FIG. 1 is a schematic diagram of an exemplary predictive header pressure control system.

The following detailed description details the functional operation of an exemplary predictive header pressure control system and method for controlling industrial steam header supply systems. Boiler setpoints and settings may be the controllable output device controlled by the predictive header pressure control system to control header pressure. In other exemplary embodiments, the control circuit may be used to control a controllable variable other than header pressure and may use controllable output devices other than boiler setpoints and loads. In still other exemplary embodiments, the control circuit may be used to control other industrial systems with controllable variables and may use other controllable output devices to control the controllable variables. Other process control applications that can benefit using the predictive control system of the invention include but are not limited to pressure control for multiple air compressor systems, water flow control, level control for tanks with complex shapes, temperature controls for lime kilns and exothermic processes. Still other applications for the predictive control system of the invention include chemical additive controls such as predictive control of pH, slaking, causticizing, $ClO_2$ reactions, evaporation and bleaching processes.

The predictive header pressure control system provides a method for controlling a process variable in a system by predicting an expected change in steam generation rate based on changes in setpoints in at least one steam generation apparatus in one embodiment. The setpoint may be changed by a separate control system dedicated to the steam generation apparatus. For each steam generation apparatus, the expected change in steam generation rate is converted to an associated anticipated rate of change in header pressure. Actual header pressure rate of change is also measured. The actual header pressure rate of change and each of the anticipated rates of change are combined to produce a combined header pressure rate of change. A header pressure rate of change setpoint is derived. The header pressure rate of change setpoint is compared to the combined header pressure rate of change, and the system provides for controlling the header pressure by generating a control signal that controls an output device such as a fuel valve, other valve, or other physical controller, that affects header pressure. Other output devices may include motors, pumps, fans, controller setpoints and outputs and electrical and mechanical relays and switches. Through a controllable output device the control signal may control a rate of change of additional steam of at least one steam generation apparatus based on the comparison of the header pressure rate of change setpoint and the combined header pressure rate of change.

Because the system anticipates changes, effectively looking ahead, the control system operates without a time lag for correction and essentially continuously maintains header pressure at setpoint. The use of different predictive steam response models enables a single controller to maintain a single header pressure setpoint in a system with multiple steam producers, i.e., boilers, turbines and the like.

As illustrated in the schematic diagram of FIG. 1, the predictive header pressure controller is used to control one or more steam producing or steam consuming devices for the purpose of header pressure control of an interconnected steam header pressure system. Steam producers and consumers include steam boilers, heat recovery steam generators with duct burners, waste-gas incinerators, steam turbines, pressure reducing valves, condensers and atmospheric vents. Included in the exemplary system of FIG. 1 are two boilers—a steam boiler and a bark boiler, but this is exemplary only and more steam generating apparatuses may be included in other embodiments. FIG. 1 illustrates the overall controller system and FIGS. 2-18 provide further details of the respective components/portions of the overall system in expanded view or further details of the operations that take place in portions of the system shown in FIG. 1. FIGS. 2-18 also explain the relationship between the respective components/portions of the predictive header pressure controller system illustrated in FIG. 1.

Figure 2:
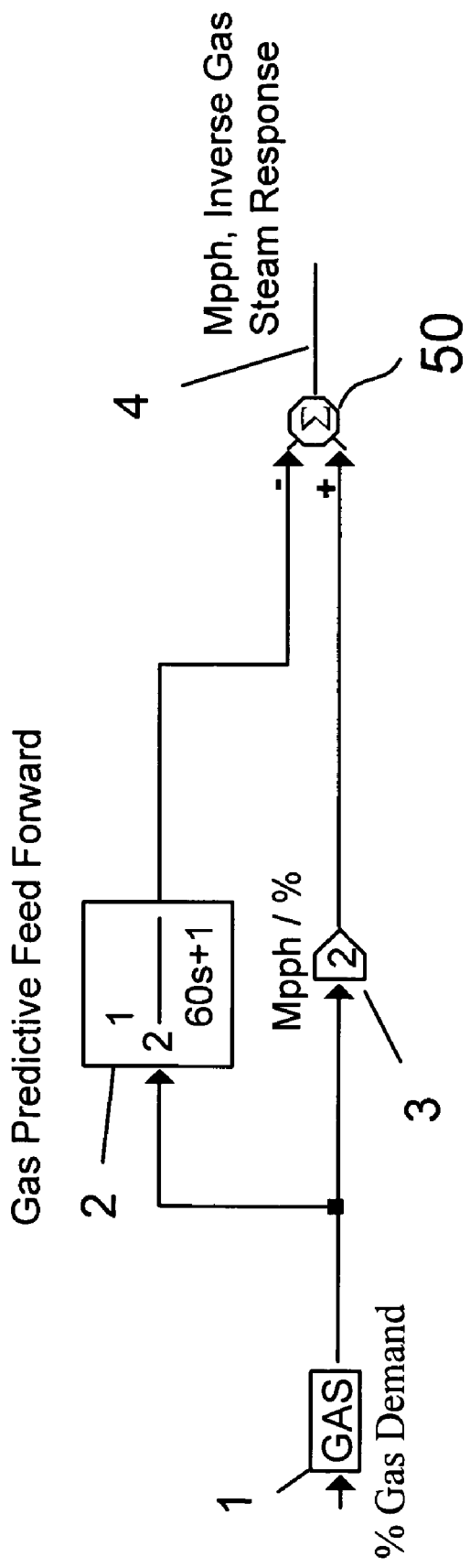
FIG. 2 is a schematic diagram of an exemplary steam generation response model for changes in gas demand and part of the system shown in FIG. 1.
Figure 3:
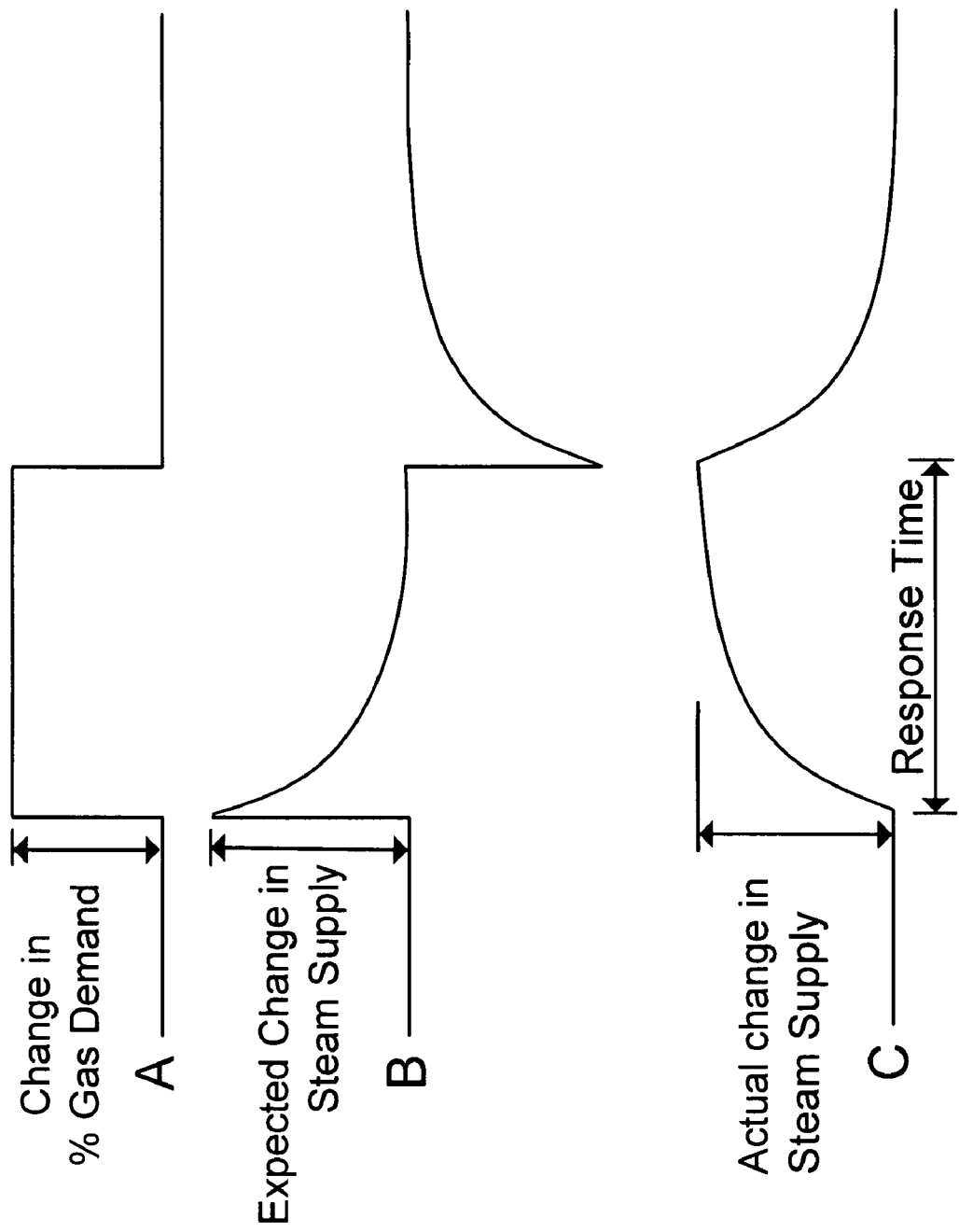
FIG. 3 illustrates response curves from the steam generation response model.

FIG. 2 shows an exemplary steam response model circuit for predicting a change in steam flow based on a setpoint of a boiler. In this example, a change in steam flow 4 is predicted for a change in % Gas Demand 1. Changes in % Gas Demand 1 cause a boiler to change the total steam flow delivered into a steam header system and may be called for by a control loop dedicated to the particular boiler (not shown), or other means. More particularly, the dedicated control loop may change the setpoint in the boiler that calls for a particular % Gas Demand. In operation, an increase in % Gas Demand 1 causes an increase in steam flow, after a response delay. Likewise, a decrease in % Gas Demand 1 causes a decrease in steam flow after a response delay. In other embodiments, setpoints for parameters other than % Gas Demand may be used to predict a change in steam flow 4 for the dedicated steam generation apparatus. Examples of other parameters include other system settings such as valve settings, and demand of percentages or absolute amounts of other constituents in a fuel/gas/oil/coal inlet mixture to the boiler, steam turbine or other steam generating apparatus.

The % Gas Demand 1 is converted at gain 3 such as by multiplying by a conversion factor to transform % Gas Demand 1 into units of steam flow such as Mpph is thousands of lbs per hour of steam, in an exemplary embodiment. This signal is subtracted from a $1^{st}$ order lag circuit 2 with the same multiplication gain as gain 3 at comparator 50 to calculate an expected/predicted change in steam flow in units of Mpph, signal 4. An exemplary lag time of 60 seconds is shown in FIG. 2 as the expected response time of changes in steam flow to changes in % Gas Demand.

Figure 4:
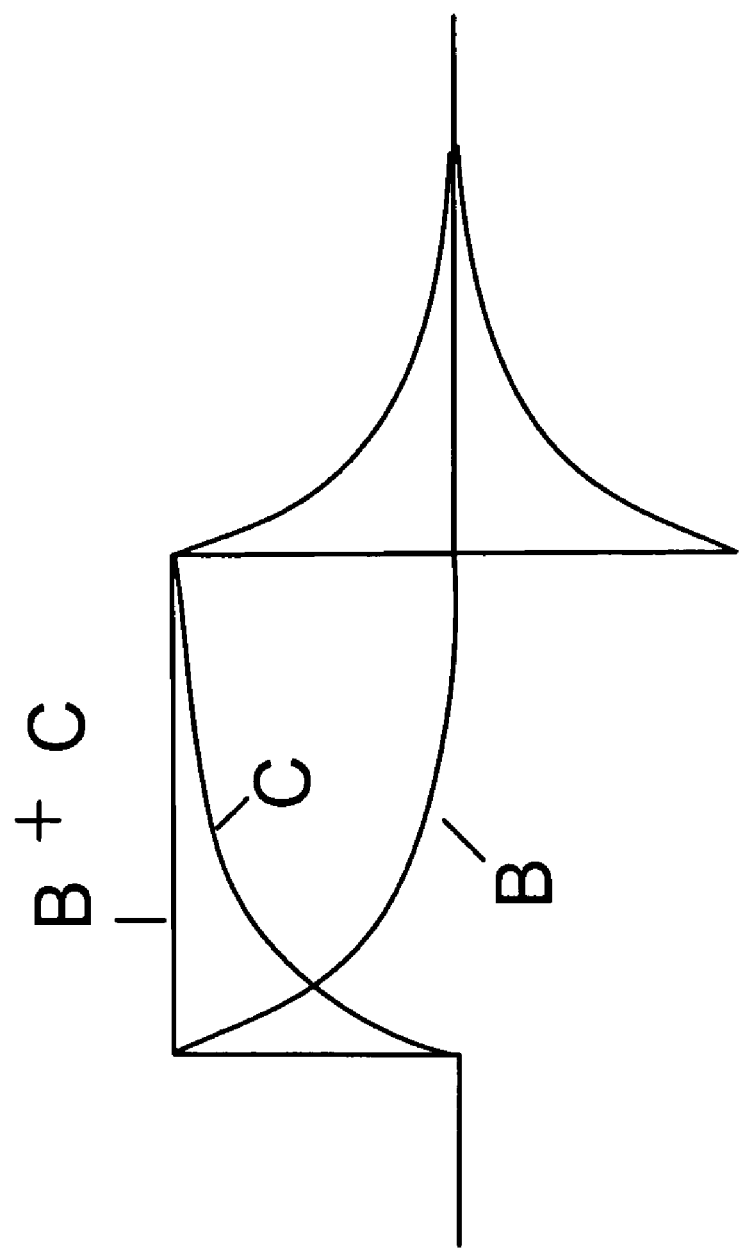
FIG. 4 shows a summation of a model response and actual response curves for percentage gas load.

The circuit of FIG. 2 predicts an expected change in a quantity (steam flow) that in operation is a delayed response to changes in setpoint (% Gas Demand) in an associated apparatus, the boiler. The system in FIG. 2 produces a response curve B responsive to changes in % Gas Load as represented in Change in % Gas Demand Curve A shown in FIG. 3. Ideally, the shape of response curve B is an exact inverse of the actual steam supply response C. The shape of the response curve is adjusted, however, by gain 3 and $1^{st}$ order response 2, as shown in FIG. 2. These values may be fitted empirically, based on results from response bump tests, for example. The summation of curves B and C produces a step response curve as shown in FIG. 4.

Figure 5:
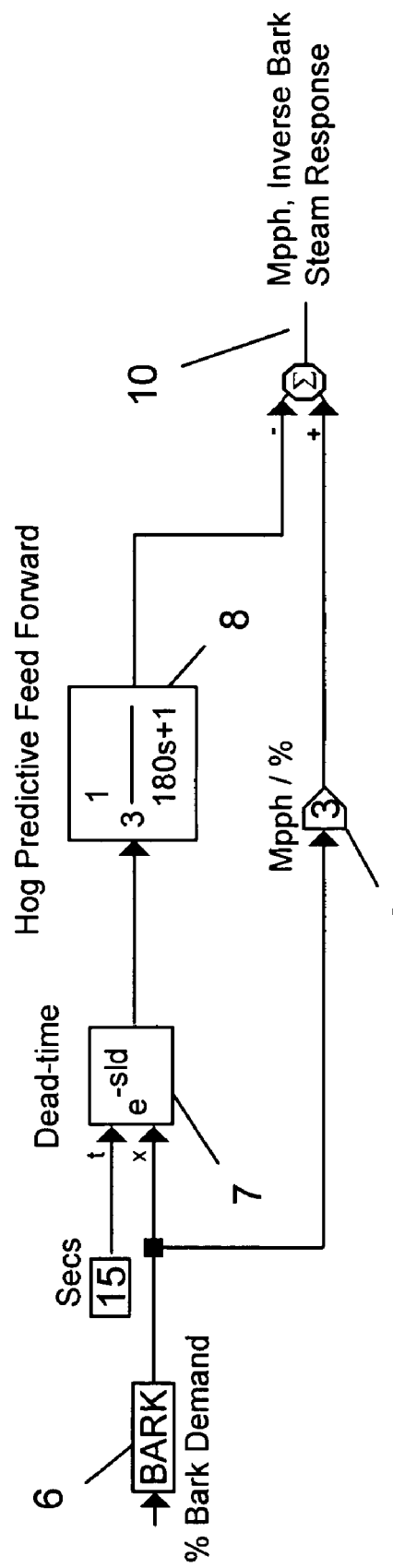
FIG. 5 is a schematic diagram showing a steam generation response model for changes in bark demand and is a portion of the system show in FIG. 1.
Figure 6:
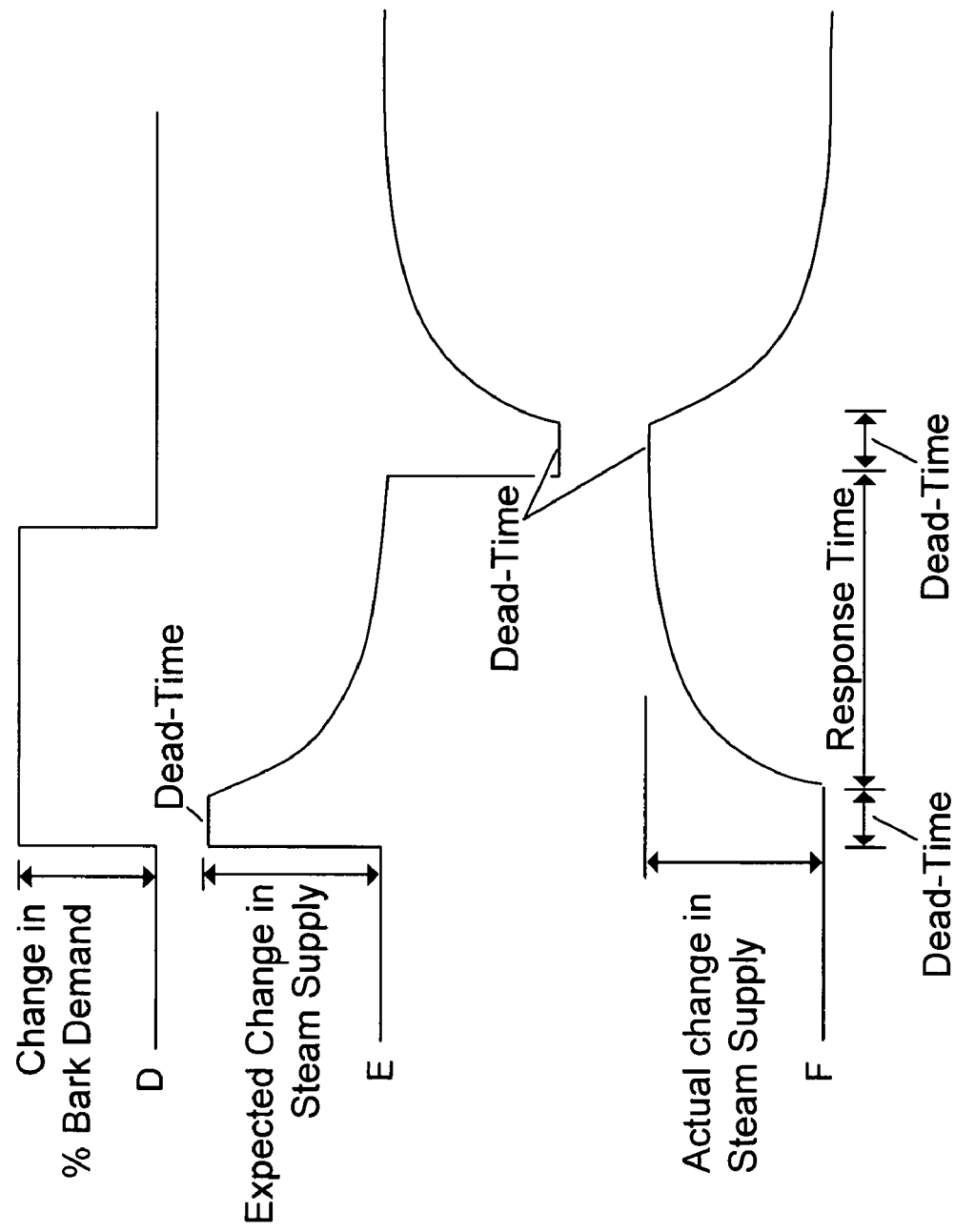
FIG. 6 shows steam response curves for process models with dead-time.
Figure 7:
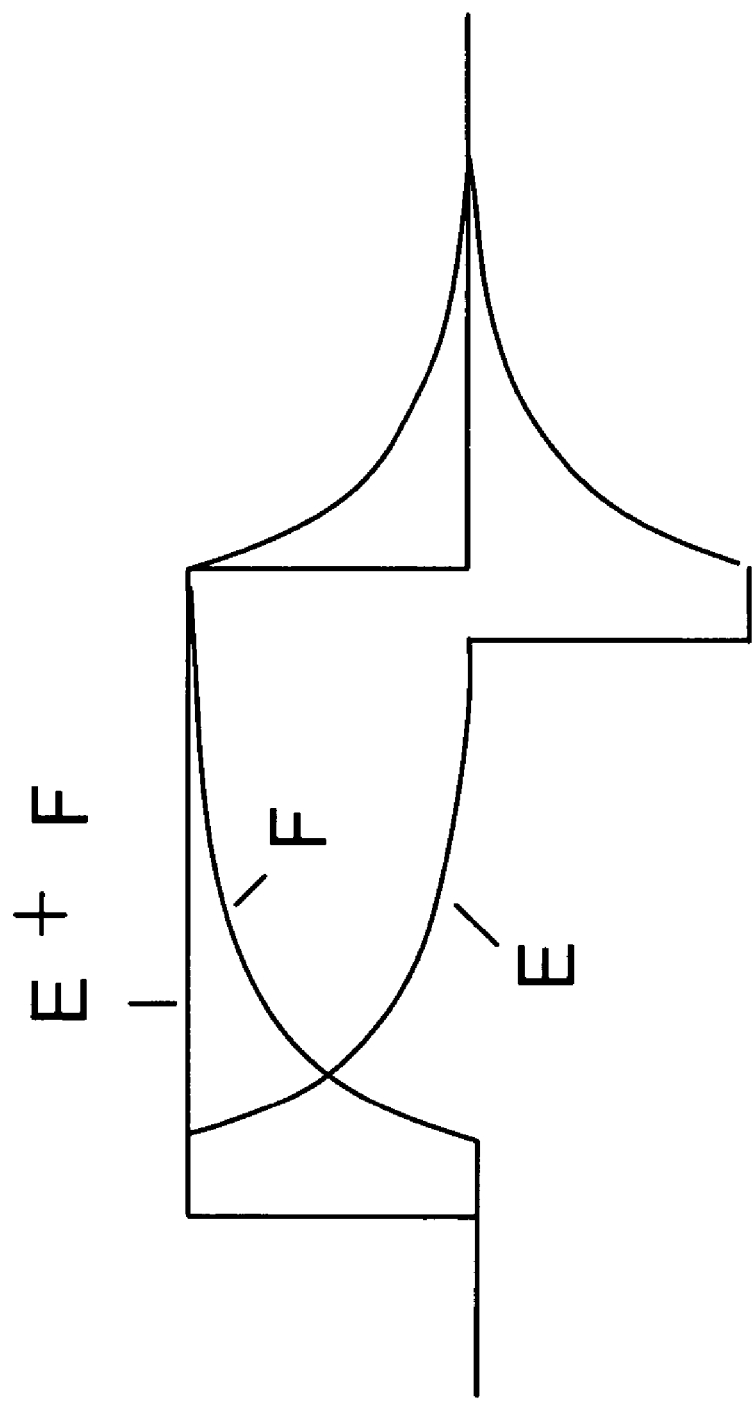
FIG. 7 shows the summation of a model response curve and actual response curve with dead-time compensation.

A similar circuit may be used to model the response time of steam generated from bark in a further boiler, as shown in FIG. 5 and also included in FIG. 1. Although FIG. 1 therefore illustrates the predictive header pressure control system summing the change of steam flow in two boilers, signals 5 from the gas boiler and signal 11 from the bark boiler, it should be understood that this is exemplary only and in other exemplary embodiments, the system may sum the change of steam flow of various pluralities of steam generating apparatuses, i.e. boilers.

Returning to FIG. 5, the difference of the circuit presented in FIG. 5 and the circuit described in FIG. 2 is the addition of dead-time compensator 7. A % Bark Demand signal 6 may be changed due to a control loop dedicated to the bark boiler or by other means. % Bark Demand signal 6 is passed through a dead-time shift register 7 to delay the signal's arrival at $1^{st}$ order lag circuit 8. % Bark Demand signal 6 is also converted by gain 9. Output signal from $1^{st}$ order lag circuit 8 is subtracted from the output of gain 9 to produce a predicted inverse steam response signal 10 due to changes in % Bark Demand 6 in the illustrated exemplary embodiment. A typical response curve generated for expected change in steam supply is shown as response curve E in FIG. 6. Response curve E is predicted in response to change in % Bark Demand D. Ideally, response curve E is an exact inverse of the actual change in steam supply represented by curve F. Summation of response curve E with actual change in steam supply F produces a step response in steam flow, shown as curve E+F in FIG. 7. Response curve E may be adjusted empirically, based on bump testing. Adjustments for curve fitting include gain 9, $1^{st}$ Order Lag time 8 and dead-time using dead-time compensator 7, as depicted in FIG. 5.

Figure 8:
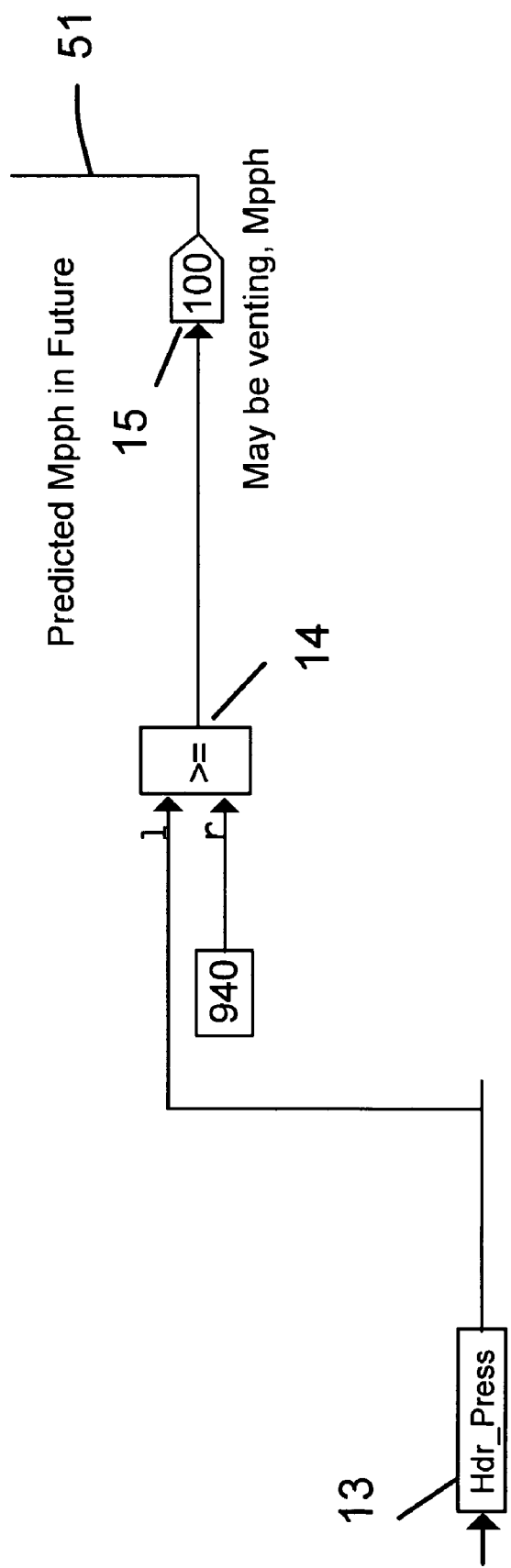
FIG. 8 is a schematic diagram showing a high pressure kicker and is part of the schematic diagram shown in FIG. 1.

The predictive header pressure controller also calculates change in header pressure over time (dPsig/dT) based on measured header pressure, as a primary means of controlling a trajectory back to setpoint. Measured header pressure 13 is indicated in FIG. 8. When a high pressure vent opens, for example, the change in header pressure (dPsig/dT) calculation gives a false indication of steam header flow imbalance. Because predictive header pressure controller assumes dPsig/dT is an indication of steam flow imbalance, a compensation circuit is utilized, as shown in FIG. 8, to compare measured header pressure 13 to a high pressure setpoint at comparator 14. The output of comparator 14 is zero when measured header pressure 13 is below threshold value 940 and one when above the threshold value. The threshold value of 940 is presented by way of example and may vary in other exemplary embodiments. The output of comparator 14 is multiplied by gain 15 to provide a steam flow imbalance "kicker" signal 51. This "kicker" signal 51 indicates a steam flow imbalance due to venting or pending venting. The size of gain 15 is preferably set to correspond to nominal venting steam flow. Adjusting the value of gain 15 changes how aggressively the predictive header pressure controller responds to very high pressure excursions. A similar kicker value may also be calculated using vent valve position, when available.

Figure 9:
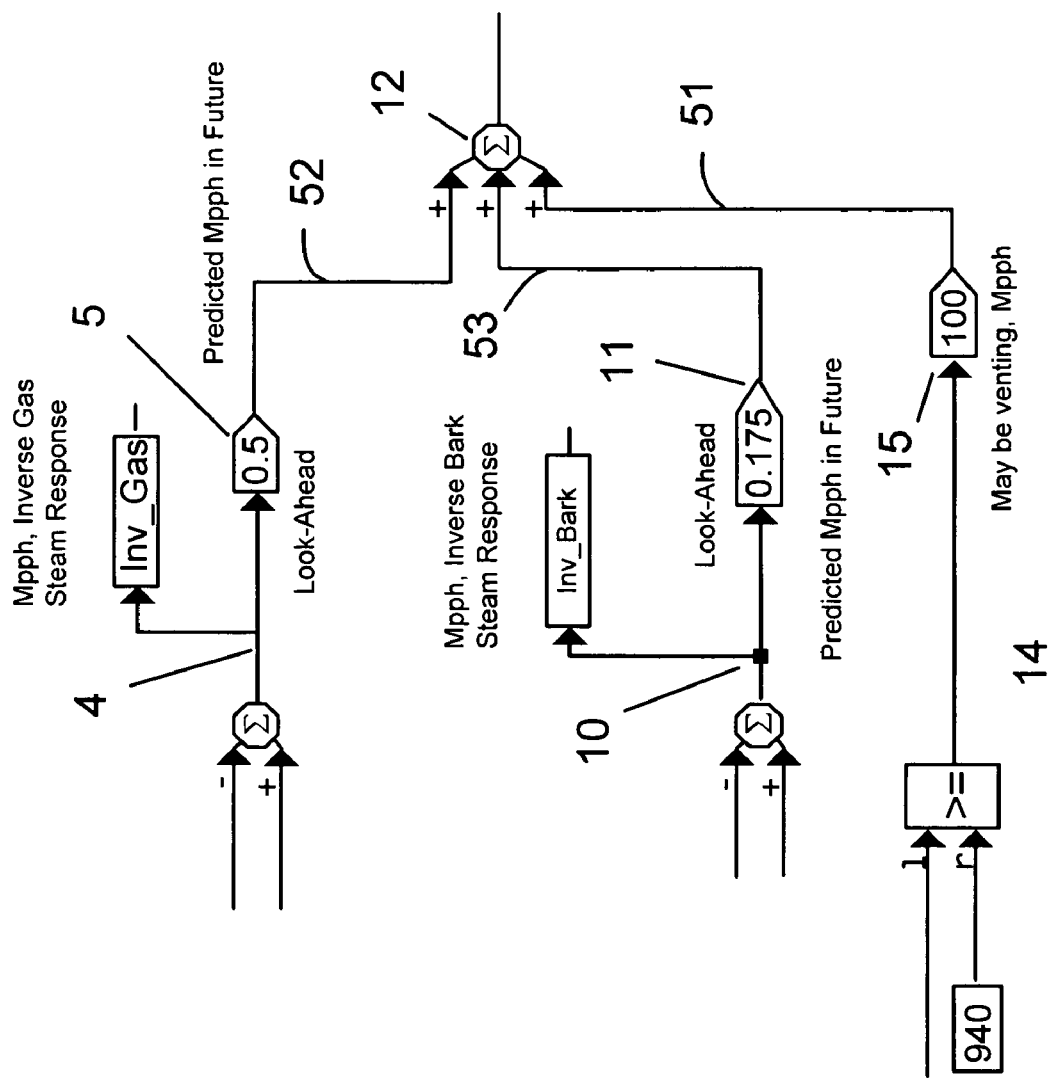
FIG. 9 is a schematic diagram showing predicted steam flow imbalance and is part of the system shown in FIG. 1.

Referring to FIGS. 1, 2 and 9, the steam response curve for changes in % Gas Demand 4, as described in FIG. 2, is multiplied by a look-ahead gain factor 5 to produce signal 52. Similarly, the steam response curve for changes in % Bark Demand 10 as described in FIG. 5, is multiplied by look-ahead gain factor 11 to produce signal 53 in FIG. 9. Signals 52 and 53 each represent steam flow. Look-ahead gains normalize various steam response curves, with different time constants, to the same reference point in time into the predicted future. Each look-ahead gain is determined as the ratio of the individual $1^{st}$ order lag response time divided by the shortest $1^{st}$ order lag response time of all steam response models required for a specific application. It this example, only two steam response curves are used, the response curve for changes in % Gas Demand of FIG. 2, and the response curve for changes in % Bark Demand of FIG. 5. It is understood that other embodiments may include additional steam responses generated by corresponding additional boilers that may use bark, gas or other fuels.

The shorter response time is gas, given at 60 seconds, shown in $1^{st}$ order lag circuit 2 of FIG. 2. The longer response time is bark, shown as 180 seconds as shown in $1^{st}$ order lag circuit 8 of FIG. 5. A ratio of 180 seconds to 60 seconds is 3:1. Therefore, referring to FIG. 9, the look-ahead gain 5 for gas will be set three times higher than the look-ahead gain 11 for bark. The highest gain value for any look-ahead gain should be no greater than 1.0. However, look-ahead gains may be reduced to compensate for non-repeatable variations in actual steaming responses. Response gains and times may vary significantly, especially for difficult waste fuels, such as bark. Variations are caused by differences in wood species, chip size, moisture content, dirt, addition of pressed sludge and other reasons.

Normalized predicted changes in steam flow derived from changes in fuel demands are added together to produce summed signals at summer 12 of FIG. 9. Any number of steam response models may be included and summed by summer 12, as required. Flow imbalance "kicker" signal 51 (FIG. 8) is added to summer 12. Signals 51, 52 and 53 are summed at summer 12. The output of summer 12 represents the expected change in steam flow imbalance in the near future, based on changes in gas demand, bark demand and high pressure venting. Near future is the shortest time constant of all the steam response models. In the illustrated embodiment, gas demand has a 60 second response time. Thus, the output of summer 12 will predict the change in steam header pressure imbalance one minute into the future, usually expressed in engineering units, typically Mpph/sec or Kg/sec².

Figure 10:
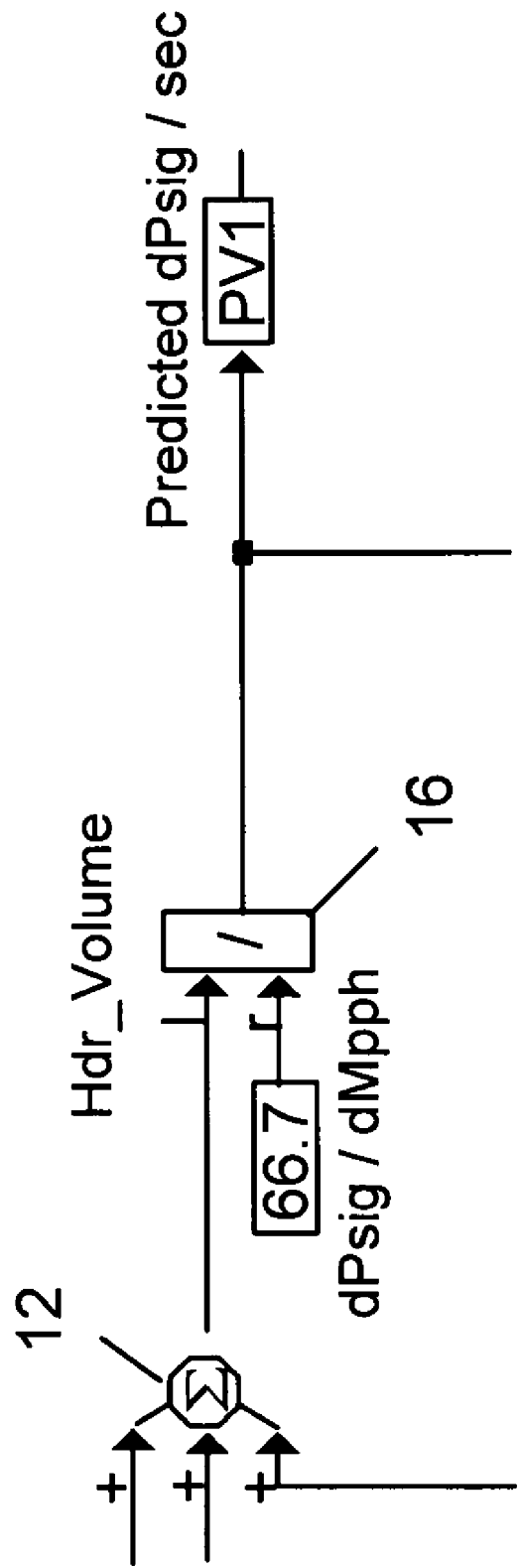
FIG. 10 is a schematic diagram of a volumetric header model and part of the system shown in FIG. 1.

For predictive header pressure control, predicted change in steam flow from summer 12 is advantageously converted into an expected change in header pressure. In FIG. 10, a header volume model 16 converts the summed predicted change in steam flow from summer 12 to predicted change in header pressure (PV1), typically expressed in dPsig/sec, using a constant value of 66.7 dPsig/dMpph in the illustrated embodiment.

Figure 11:
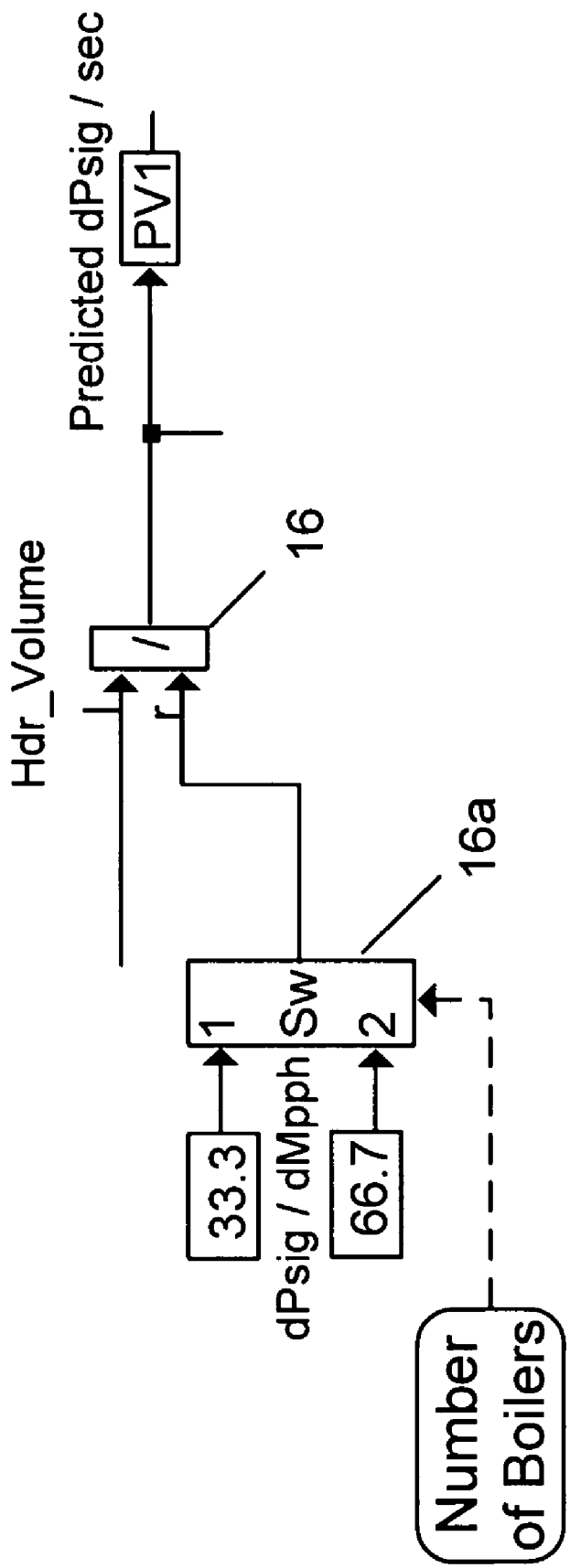
FIG. 11 is a schematic diagram showing the application of exemplary switching header volume constants and is part of the system shown in FIG. 1.

The constant used to convert change in steam flow to change in header pressure (dPsig/dMpph), is determined empirically by process bump tests. When steam production is steady, a known step change in steam demand is made. Rate of change in header pressure in response to a known step change in steam demand may be used to determine the conversion ratio used in the header volume model 16 of FIGS. 10 and 11. In FIG. 11, another exemplary embodiment shows optional switch 16a which may be used to select different header volume constants for various combinations of on-line equipment. For example, the header volume constant with one boiler on-line is different than the same when two boilers are on-line. The switch position dynamically selects the appropriate constant, such as constant 1 (33.3) or constant 2 (66.7) indicated on FIG. 11, depending on equipment configuration signals.

Figure 12:
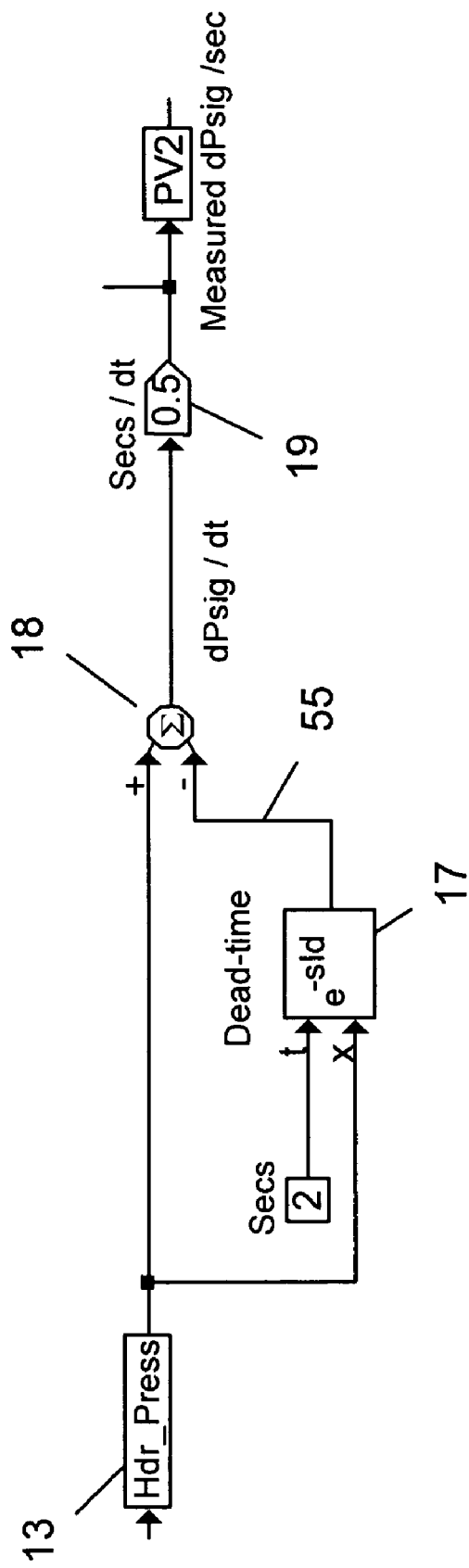
FIG. 12 is a schematic diagram illustrating an exemplary method for measuring change in header pressure as in the system shown in FIG. 1.

The actual header pressure and change in actual header pressure is also measured and utilized. One method that may be used to determine measured change in header pressure is shown in FIG. 12. Change in header pressure is calculated by comparing at comparator 18 a delayed header pressure signal 55 and measured header pressure signal 13. In this illustration, a two second delay 17 is used to delay the header pressure signal 13 and produce delayed header pressure signal 55 which is subtracted from measured header pressure signal 13. The output (difference) of comparator 18 is multiplied by constant 19 to derive measured change in header pressure (PV2) in units of Psig/sec, also shown in FIG. 1. Constant 19 is the inverse of the number of seconds the measured header pressure was delayed to produce delayed header pressure signal 55. Other engineering units may be used, such as Psig per minute, KPA per second, etc. in other embodiments.

Figure 13:
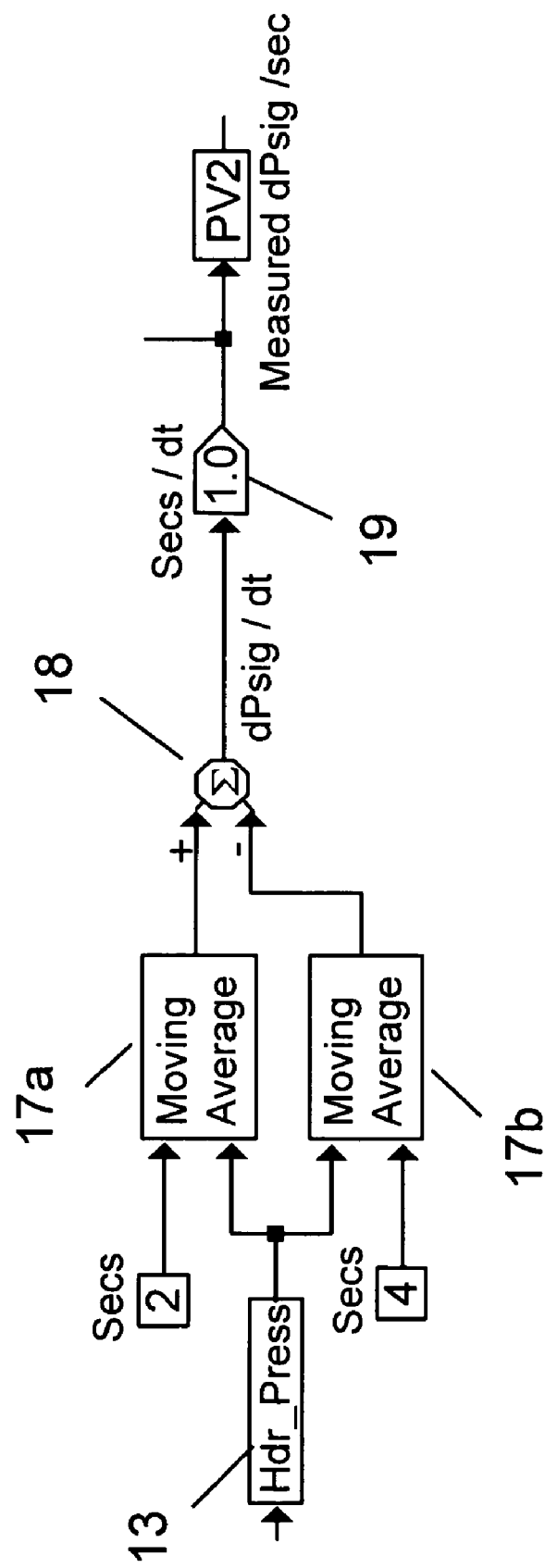
FIG. 13 is a schematic showing another exemplary method for measuring change in header pressure as in the system shown in FIG. 1.

In another exemplary embodiment, an alternative method may be used to calculate change in header pressure and yield derived measured change in header pressure PV2. FIG. 13 shows another embodiment in which two moving measured averages 17a & 17b are used. Long moving average 17b is subtracted from short moving average 17a at comparator 18. The output (difference) of comparator 18 is multiplied by constant 19 to produced measured change in pressure signal PV2. In the exemplary embodiment, constant 19 converts the change in time component to seconds using the following equation:

Constant 19=2/(Long seconds−Short seconds)=2/(4−2)=1.0

Settings for long and short moving averages are preferably determined empirically, based on pressure transmitter resolution and process measurement noise.

Figure 14:
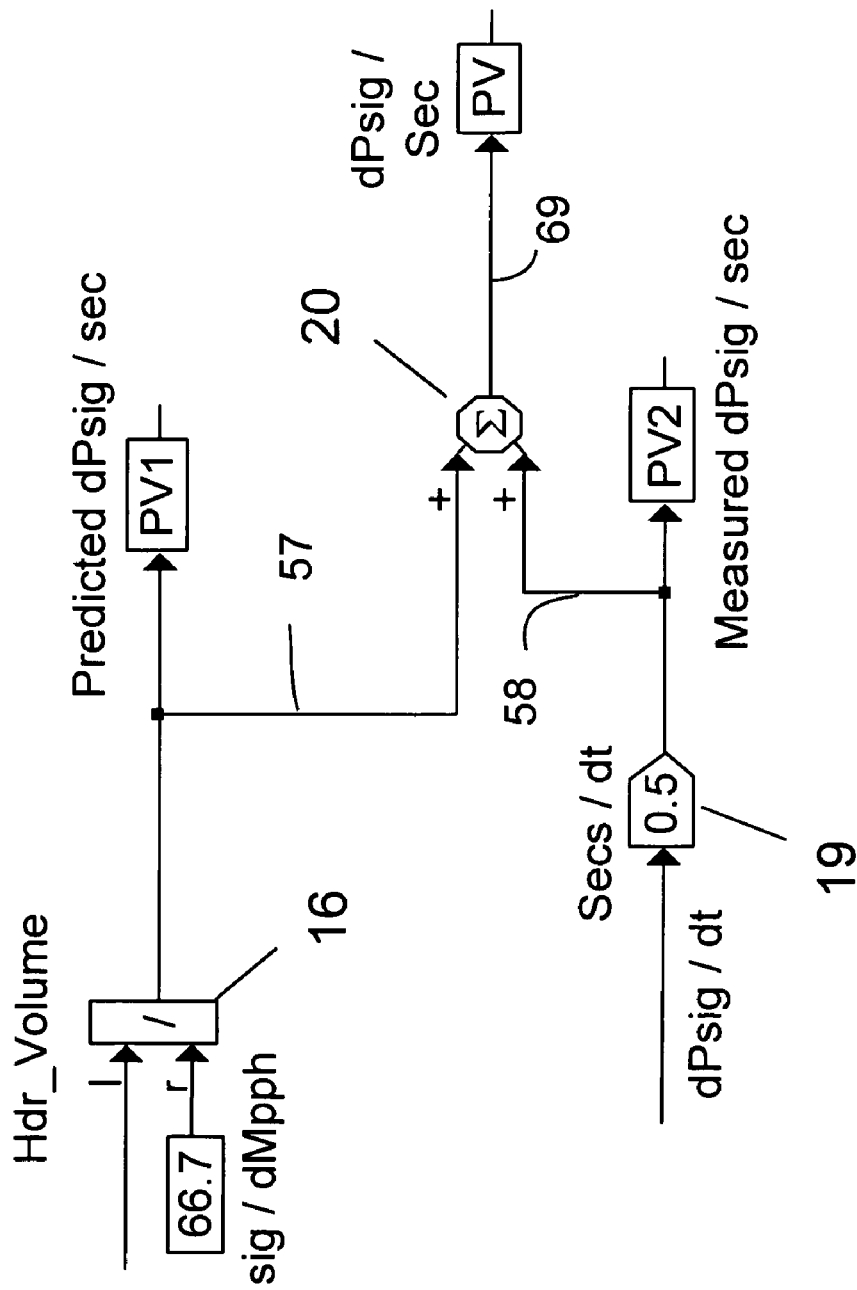
FIG. 14 is a schematic diagram showing predicted plus measured change in pressure and forms part of the system shown in FIG. 1.

As shown in FIG. 14, predicted change in header pressure signal 57 from header volume model 16 is added to measured change in header pressure 58 by summer 20 to calculate a final process control variable PV (dPsig/sec) that represents predicted plus measured change in header pressure over time and is also shown as signal 69.

Figure 15:
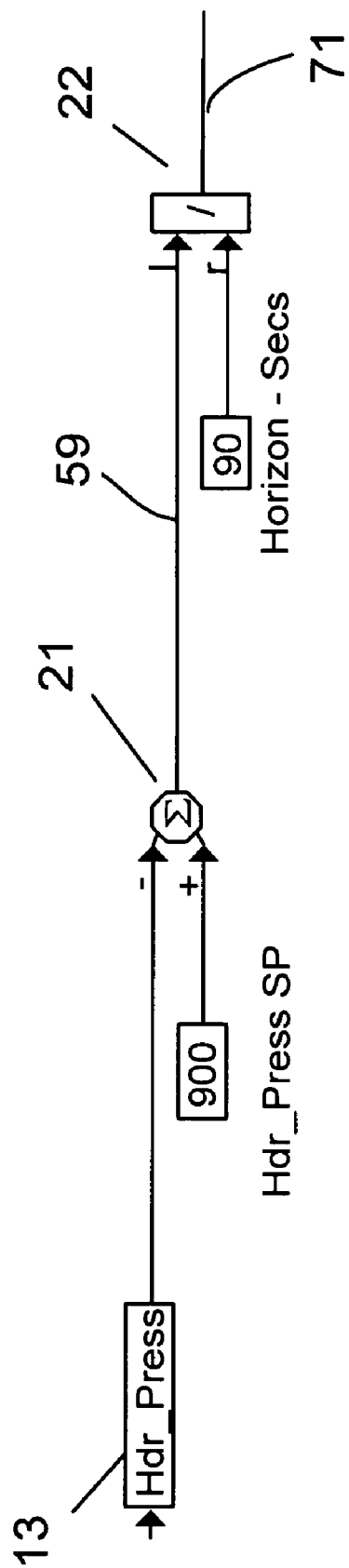
FIG. 15 is a schematic diagram illustrating a header pressure deviation signal and forms part of the system shown in FIG. 1.

In FIG. 15, measured header pressure 13 is compared to header pressure setpoint (Hdr_Press SP, or SP) which is 900 in the illustrated embodiment, at comparator 21. In the exemplary embodiment, measured header pressure 13 is subtracted from the header pressure setpoint at comparator 21. Units of comparator 21 may be in engineering units, such as Psig or KPA. The header pressure deviation from setpoint value 59 provided by comparator 21 is divided at comparator 22 by a horizon time constant, generally specified in units of seconds or minutes, and set to 90 seconds in the illustrated embodiment. The horizon time constant value is the primary tuning constant of the predictive header pressure controller. Its value usually ranges from one-half to three times the shortest $1^{st}$ order lag time constant in control but may vary in other embodiments. In this example, gas has a time constant of 60 seconds, as depicted in $1^{st}$ order time lag 2 of FIG. 2 so that the 90 second horizon time constant divided by 60 second time constant yields a ratio or lambda of 1.5. The value of lambda is empirically tuned in the range of 0.5 to 3.0. In another embodiment with adaptive gain (not shown), the horizon time constant may be dynamically adjusted depending on which fuels are capable of swing steam load. Output signal 71 of comparator 22 is a header pressure rate of change setpoint and is used as a trajectory setpoint, typically expressed in units of dPsig/sec or dKPa/sec.

Figure 17:
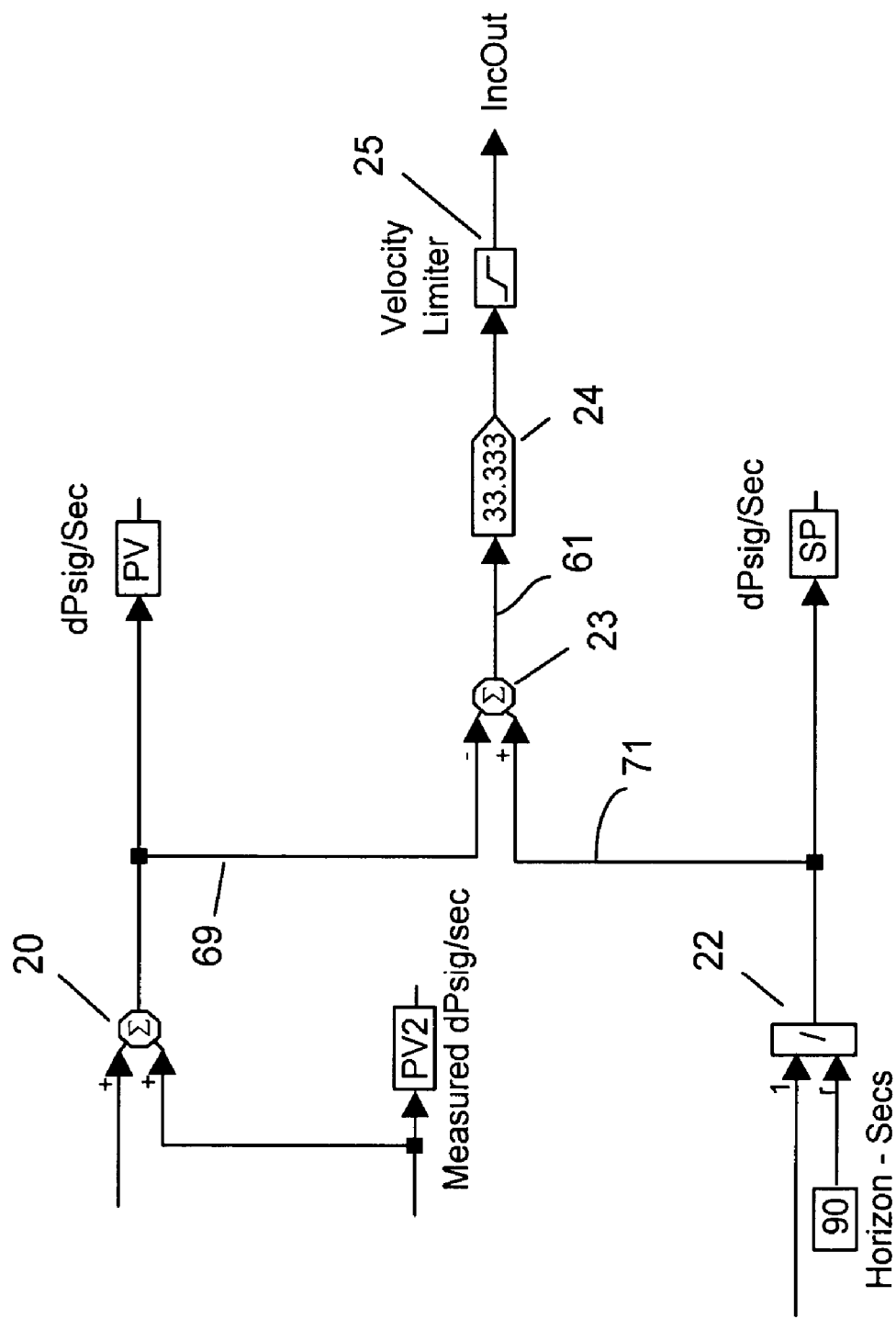
FIG. 17 is a schematic diagram illustrating integral control action and is part of the system shown in FIG. 1.

The horizon time constant represents a time into the future that any deviation of the final process control variable (PV, FIG. 14) from setpoint (SP, FIG. 15) should reach zero. In the exemplary embodiment, the horizon time constant is 90 s. Based on process deviation, a rate of change setpoint (RC-SP) is derived in units of change in pressure per unit of time (dPsig/dt), as described in conjunction with FIG. 15 according to [(SP−PV)/Horizon] and shown in FIG. 16A. The predictive header pressure controller controls the change in anticipated plus measured change in header pressure using the rate of change setpoint (RC-SP) calculated based upon the deviation of PV from SP as shown in FIG. 16B. As the dynamic final process control variable (PV) changes and approaches setpoint (SP), the system continuously re-calculates rate-of-change setpoint (RC-SP) which changes correspondingly and approaches zero as shown in FIG. 16C. The horizon time constant value remains fixed (e.g., 90 seconds) so at each instance of time that (PV) changes and the rate of change setpoint (RC-SP) is re-calculated, the actual time associated with the horizon time constant represents a time that is further into the future as shown in FIG. 16C which indicates that the controlled response of header pressure, indicated by the final process control variable (PV), back to setpoint (SP) is actually exponential. FIG. 16D illustrates how tuning is accomplished by adjusting the horizon value. The closer the value of the horizon time constant is to zero, the less dampening effect of the control curve. The larger the horizon time constant value, the more dampening of the control curve. If the horizon time constant is set too close to zero, the process can become unstable and oscillate The output control signal of the predictive header pressure control systems may be an integrated output 26 shown in FIG. 1 or an incremental output 25 shown in FIG. 1. FIG. 17 shows the integral control action. In FIG. 17, a header pressure rate of change deviation signal 61 is calculated by subtracting the predicted plus measured change in header pressure signal 69 from summer 20, from header pressure rate of change setpoint signal 71 from comparator 22, at difference block or comparator 23. The output, signal 61 from difference block 23 represents header pressure rate of change deviation and is multiplied by gain 24 that converts header pressure rate of change deviation to appropriate output engineering units such as percentage of boiler load, units of steam and the like. The signal is then velocity limited at velocity limiter 25 to generate a final incremental output (IncOut). Gain constant 24 is calculated based on volumetric header constant 16 and scaling of the output demand signal.

Figure 18:
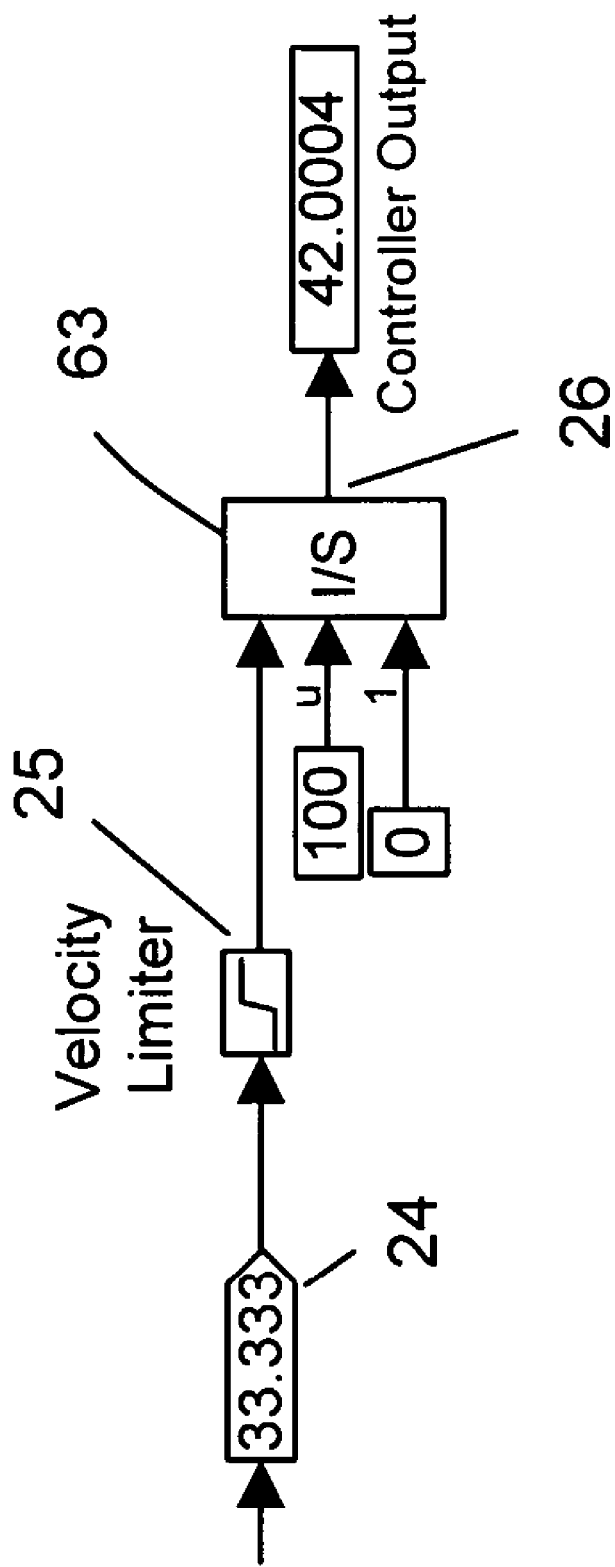
FIG. 18 illustrates integration of a final incremental output and forms part of the system shown in FIG. 1.
Figure 19:
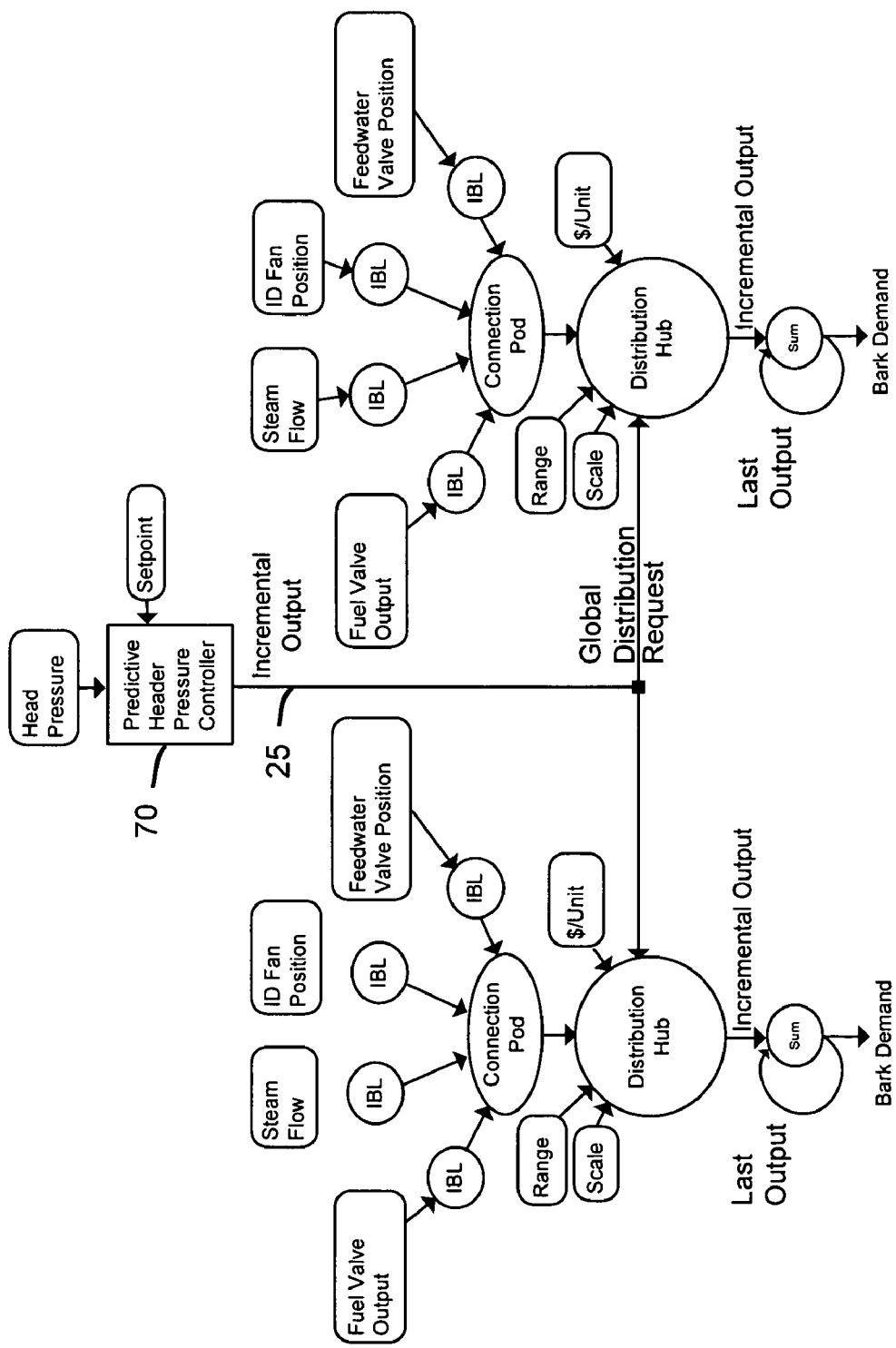
FIG. 19 is a schematic illustrating an incremental output of the system shown in FIG. 1 as applied to a cooperative distribution hub network.

The final, incremental output from velocity limiter 25 may be used to drive distribution hubs for economic allocation to multiple boilers and fuels, as depicted in FIG. 18. For single output applications, the incremental output may be integrated at integrator 63 to produce a non-incremental output 26, such as the 0% to 100% output, as shown in FIGS. 17 and 1.

The incremental or integrated output may be sent to a controllable output device that controls steam header pressure. For example, the controllable output device may be a fuel valve, other valve, or various other setpoints for the steam generating systems or other physical controllers that affect header pressure. Other output devices may include motors, pumps, fans, controller setpoints and outputs and electrical and mechanical relays and switches on one or various pluralities of the boilers or other steam generator devices of the system.

FIG. 18 is a schematic diagram showing an exemplary distribution hub such as described in detail in pending U.S. application Ser. No. 10/923,963 titled "Recurrent Distribution Network with Input Boundary Limiters" filed on Aug. 23, 2004, the contents of which are hereby incorporated by reference. In FIG. 18, the predictive header pressure control system of the present invention is indicated as predictive header pressure controller 70. Incremental output 25, also shown in FIGS. 1, 16 and 17 provides the global distribution request signal to the plurality of distribution hubs to which the predictive header pressure system 70 is coupled. As described in application Ser. No. 10/923,963, each distribution hub of the plurality of cooperative distribution hubs is coupled to an associated controllable output device that affects header pressure, such as a valve, input quantity or other setting that effects steam generation, for example. Each distribution hub is also coupled to a corresponding plurality of connection hubs, and each connection hub is connected to a plurality of boundary limiting devices (IBL's). An input signal indicative of a dependent process variable such as fuel valve output, steam flow, ID fan position, or feedwater valve position, for example, is delivered to each boundary limiting device and the corresponding boundary limiting device compares the input signal to at least one boundary limit and sends output signals including the input signal, to an associated one of the connection hubs. The connection hubs send information based on the output signals to the distribution hubs. When the global distribution request, incremental output 25 from predictive header pressure controller 70, is sent, it causes a plurality of cooperating distribution hubs to cooperatively adjust at least one of the controllable output devices to control header pressure by exchanging the information between distribution hubs and using heuristic rules responsive to the incremental output and based on the information provided by the connection hubs and shared among distribution hubs.

Aspects of the present invention include:
1. Predictive models are used to anticipate future, expected changes in steam generation of equipment, based on changes in boiler load setpoints or parameters.
2. A volumetric header model converts anticipated changes in steam demand into an anticipated rate of change of header pressure in the near future (dpisg/dt) as a consequence of changes in boiler load setpoints.
3. The anticipated or predicted header pressure rate-of-change, determined by a change in boiler load setpoints, is combined with a measured header pressure rate-of-change. The measured header pressure rate-of-change is calculated from multiple header pressure readings over a fixed time base or with two moving averages. The combination of measured and anticipated rate of change is used as the controller's input PV.
4. A rate-of-change setpoint (SP) is derived from the deviation of header pressure setpoint minus measured header pressure divided by a "horizon" time value.
5. The difference of the rate of change setpoint SP and the controller's input PV is multiplied by a control gain that converts header pressure rate-of-change deviation to appropriate output engineering units such as % boiler load, or units of steam (Mpph). Controlling change in header pressure, instead of header pressure directly, enables effective, integral-only control action.
6. A velocity limiter restricts the maximum rate of change for additional boiler steam. The velocity limiter output may be scaled in units of steam (Mpph, Kg/sec, Lbs/Hr, etc.) and input into a distribution hub for allocation to various boilers and fuels.
7. For single output applications, an output integrator can be used to convert incremental requests for steam into a final, 0 to 100% output to a controller setpoint, typically boiler % load setpoint.

The present invention provides predictive boiler steaming models that anticipate/predict future changes in boiler steaming rates. Predicted steaming rates are converted to anticipated rates of change in header pressure. Measured rates of change in header pressure are calculated based on multiple header pressure samples taken over time or using two moving averages. A controlled process variable is derived by a combination of measured and anticipated rates of change in header pressure. A controlled process rate of change pressure setpoint may be derived by subtracting the measured header pressure signal from the header pressure setpoint divided by a horizon time factor. The control signal may be an integral-only control with incremental output that determines the appropriate output for header pressure rate of change control. The system may provide an incremental output that is directly compatible with distribution hubs or the incremental output may be integrated to produce a non-incremental output such as a 0% to 100% output.

The present invention provides the advantage of achieving more stable header pressure control when using multiple steam sources with various gains and response times. Prediction of steaming rate-of-change in boilers allows more robust tuning without over responding due to lag times in boiler responses. Multiple steam producers with different time constants are accommodated by use of predictive steam response models. This permits a single controller to maintain header pressure with multiple boilers and fuels with very different time constants. When used in conjunction with Distribution Hubs and input boundary limiters, header pressure is achieved with multiple steaming sources and fuels at minimum cost within constraint boundaries. This capability improves fuel efficiency, reduces green house emissions and reduces manufacturers' total cost per unit of product.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. In particular, the numerical values such as constants and conversion factors shown in the exemplary embodiment, are intended to be exemplary only. Other values may be used in other embodiments. Other process control applications that can benefit using the predictive control system of the invention include but are not limited to pressure control for multiple air compressor systems, water flow control, level control for tanks with complex shapes, temperature controls for lime kilns and exothermic processes. Still other applications for the predictive control system of the invention include chemical additive controls such as predictive control of pH, slaking, causticizing, $ClO_2$ reactions, evaporation and bleaching processes. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for controlling a controllable variable in a system comprising:
    predicting an expected change in an output that is a delayed response to changes in at least one setpoint in an associated apparatus, for at least one said apparatus;
    for each said apparatus, converting said expected change in said output to an associated anticipated rate of change in said controllable variable;
    measuring actual rate of change of said controllable variable;
    combining said actual rate of change and each of said anticipated rates of change to produce a combined rate of change;
    deriving a rate of change setpoint;
    comparing said rate of change setpoint to said combined rate of change; and
    controlling said controllable variable by generating a control signal that controls a rate of change of said controllable variable based on said comparing.

2. The method as in claim 1, wherein said controlling includes said control signal controlling an output of at least one said apparatus.

3. A method for controlling header pressure in a system, said method comprising:
    predicting an expected change in steam generation rate based on changes in a first setpoint in an associated steam generation apparatus, for at least one said steam generation apparatus that affects header pressure of said system;
    for each said steam generation apparatus, converting said expected change in steam generation rate to an associated anticipated rate of change in said header pressure;
    measuring actual rate of change of said header pressure; and
    controlling said header pressure by sending a control signal based on said actual rate of change and each of said anticipated rates of change.

4. A method for controlling a process variable in a system, said method comprising:
    predicting an expected change in steam generation rate based on changes in a first setpoint in an associated steam generation apparatus, for at least one said steam generation apparatus;
    for each said steam generation apparatus, converting said expected change in steam generation rate to an associated anticipated rate of change in header pressure;
    measuring actual header pressure rate of change;
    combining said actual header pressure rate of change and each of said anticipated rates of change, to produce a combined header pressure rate of change;
    deriving a header pressure rate of change setpoint;
    comparing said header pressure rate of change setpoint to said combined header pressure rate of change; and
    controlling said header pressure by generating a control signal that controls said header pressure based on said comparing.

5. The method as in claim 4, wherein said steam generation apparatus is a boiler or steam turbine.

6. The method as in claim 4, wherein said controlling comprises controlling said steam generation rate of at least one said steam generation apparatus.

7. The method as in claim 4, wherein said predicting includes monitoring a change in percentage gas demand delivered to said steam generation apparatus.

8. The method as in claim 7, wherein said change in percentage gas demand delivered to said steam generation apparatus is determined by a control loop associated with said associated steam generation apparatus.

9. The method as in claim 4, wherein said deriving comprises deriving said header pressure rate of change setpoint from a deviation of a header pressure setpoint minus measured header pressure, divided by a time value.

10. The method as in claim 4, wherein said comparing comprises taking a difference between said header pressure rate of change setpoint and said combined header pressure rate of change.

11. The method as in claim 4, wherein said measuring actual header pressure rate of change comprises calculating said actual header pressure rate of change from multiple measurements of said header pressure taken over time.

12. The method as in claim 4, wherein said converting is done by a volumetric header model.

13. The method as in claim 4, wherein said controlling said header pressure comprises controlling a rate of change of said header pressure.

14. The method as in claim 4, wherein said comparing produces a header pressure rate of change deviation and further comprising multiplying said header pressure rate of change deviation by a control gain that converts said header pressure rate of change deviation to a corresponding change in steam flow or a change in percentage of boiler load demand to correct measured plus predicted steam header flow imbalance.

15. The method as in claim 4, wherein said controlling said header pressure includes using a velocity limiter to restrict a maximum rate of change of additional steam for at least one said steam generation apparatus.

16. The method as in claim 4, wherein said controlling comprises sending an integrated output signal to a controllable output device that controls said header pressure.

17. The method as in claim 4, wherein said controlling comprises sending an incremental output signal as a global request to a plurality of cooperative distribution hubs.

18. The method as in claim 17, wherein said plurality of cooperative distribution hubs comprise each distribution hub coupled to an associated controllable output device that affects said header pressure and a corresponding plurality of connection hubs, each connection hub coupled to a plurality of boundary limiting devices, and further comprising:

- causing an input signal indicative of a dependent process variable to be delivered to each said boundary limiting device, each boundary limiting device comparing said input signal to at least one boundary limit and sending output signals including said input signal, to an associated one of said connection hubs;
- said connection hubs sending information based on said output signals, to an associated one of said distribution hubs; and
- said plurality of cooperating distribution hubs cooperatively adjusting at least one of said controllable output devices to control said header pressure by exchanging said information and using heuristic rules, responsive to said incremental output and based on said information.

19. The method as in claim 4, wherein said first setpoint changes responsive to a control system dedicated to said associated steam generation apparatus.

20. A predictive control system comprising:

- means for predicting an expected change in steam generation rate based on changes in at least one setpoint in an associated steam generation apparatus, for at least one said steam generation apparatus;
- for each said steam generation apparatus, means for converting said expected change in steam generation rate to an associated anticipated rate of change in header pressure;
- means for measuring actual header pressure rate of change;
- means for combining said actual header pressure rate of change and each of said anticipated rates of change, to produce a combined header pressure rate of change;
- means for deriving a header pressure rate of change setpoint;
- a comparator that compares said header pressure rate of change setpoint to said combined header pressure rate of change; and
- a controller that receives information from said comparator and generates a control signal that controls said header pressure based on said information.

21. The system as in claim 20, wherein said steam generation apparatus comprises one of a boiler and a steam turbine.

22. The system as in claim 20, further comprising a control loop on said associated steam generation apparatus that includes means for changing said at least one setpoint based on an output of said steam generation apparatus.

23. The system as in claim 20, wherein said controller sends signals to said steam generation apparatus to control said steam generation rate of said steam generation apparatus.

24. The system as in claim 20, wherein said control signal comprises one of an incremental output signal and an integrated output signal.

25. The system as in claim 24, wherein said signal comprises an incremental output signal and further comprising:

- a plurality of cooperative distribution hubs, each coupled to an associated controllable output device that affects said header pressure;
- a corresponding plurality of connection hubs, each inputting information to a corresponding distribution hub and coupled to a plurality of boundary limiting devices, each boundary limiting device receiving at least an input signal indicative of a corresponding dependent process variable and including limiting means for comparing said input signal to low and high boundary limits, and sending means for sending output signals to said connection hub,
- wherein said control signal comprises a global request sent to said plurality of cooperating distribution hubs,
- and further comprising adjusting means for adjusting steam generation rate in at least one said steam generation apparatus using heuristic rules, said means for adjusting including said plurality of cooperating distribution hubs cooperatively adjusting said steam generation rate.

* * * * *